United States Patent
Kwatra et al.

(10) Patent No.: US 10,061,999 B1
(45) Date of Patent: Aug. 28, 2018

(54) SYSTEM AND METHOD FOR USING SEGMENTATION TO IDENTIFY OBJECT LOCATION IN IMAGES

(71) Applicant: Google Inc., Mountain View, CA (US)

(72) Inventors: Vivek Kwatra, Santa Clara, CA (US); Jay Yagnik, Santa Clara, CA (US); Alexander Toshkov Toshev, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 10 days.

(21) Appl. No.: 15/339,616

(22) Filed: Oct. 31, 2016

Related U.S. Application Data

(62) Division of application No. 13/299,281, filed on Nov. 17, 2011, now Pat. No. 9,483,701.

(51) Int. Cl.
*G06K 9/62* (2006.01)
*G06K 9/32* (2006.01)
*G06T 7/00* (2017.01)

(52) U.S. Cl.
CPC ......... *G06K 9/3241* (2013.01); *G06K 9/6255* (2013.01); *G06T 7/0081* (2013.01); *G06T 7/0097* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 2005/0097489 A1* | 5/2005 | Seward | ............... | G06F 17/5068 716/123 |
| 2009/0304229 A1* | 12/2009 | Hampapur | ......... | G06K 9/00771 382/103 |
| 2009/0310823 A1 | 12/2009 | Cherng et al. | | |
| 2013/0016877 A1 | 1/2013 | Feris et al. | | |
| 2016/0004904 A1* | 1/2016 | Senechal | ............ | G06K 9/00228 382/118 |

OTHER PUBLICATIONS

Grundmann, M., et al., "Efficient Hierarchical Graph-Based Video Segmentation", Computer Vision and Pattern Recognition (CVPR 2010), 8 pgs.

* cited by examiner

*Primary Examiner* — Fred Hu
(74) *Attorney, Agent, or Firm* — Lowenstein Sandler LLP

(57) ABSTRACT

An example method is disclosed that includes identifying a training set of images, wherein each image in the training set has an identified bounding box that comprises an object class and an object location for an object in the image. The method also includes segmenting each image of the training set, wherein segments comprise sets of pixels that share visual characteristics, and wherein each segment is associated with an object class. The method further includes clustering the segments that are associated with the same object class, and generating a data structure based on the clustering, wherein entries in the data structure comprise visual characteristics for prototypical segments of objects having the object class and further comprise one or more potential bounding boxes for the objects, wherein the data structure is usable to predict bounding boxes of additional images that include an object having the object class.

20 Claims, 11 Drawing Sheets

SYSTEM AND METHOD FOR USING SEGMENTATION TO IDENTIFY OBJECT LOCATION IN IMAGES

PRIORITY CLAIM

This application is a divisional application of U.S. Non-Provisional patent application Ser. No. 13/299,281, filed Nov. 17, 2011, entitled "SYSTEM AND METHOD FOR USING SEGMENTATION TO IDENTIFY OBJECT LOCATION IN IMAGES", which is incorporated herein by reference for all purposes.

TECHNICAL FIELD

Embodiments of the present invention relate to the field of image recognition and, more particularly, to a technique of performing image recognition using segmentation for localization of objects.

BACKGROUND

A digital image is generally a representation of a real image (e.g., a photograph) in a format which may be processed by a computer system. A digital image generally comprises a plurality of picture elements (e.g., pixels) arranged in a two-dimensional array. Each pixel may have a color and/or a color value associated with the pixel. Information associated with the location and color of each pixel may be stored and/or used by a computer system to display the digital image.

Image analysis systems are designed to extract information from an image and determine properties of the image from the extracted information. A common task for image analysis is to identify and classify objects in images. Object detection is the task of ascertaining that a set of pixels in an image is associated with a particular object. Object recognition is the task of identifying what the object is (e.g., a car, a tree, etc.). For example, object recognition techniques may be used to identify that an image includes a car and a road, or that an image contains a tree and a person. There are multiple techniques for performing object detection and object recognition. However, current object detection and object recognition techniques still fail to accurately recognize objects or misclassify objects in many instances.

SUMMARY

In an embodiment of the present invention, a computing device segments an image into a plurality of segments. Each segment of the plurality of segments may have a segment location and a set of pixels that share visual characteristics. The computing device determines an initial set of bounding boxes for the image based on the plurality of segments. The computing device then determines a reduced set of bounding boxes based on combining bounding boxes of the initial set of bounding boxes, the reduced set of bounding boxes corresponding to one or more objects in the image. Each of the one or more objects has an object class and an object location that are identified.

In one embodiment, to determine the initial set of bounding boxes, the computing device identifies data structures that include entries having visual characteristics that most closely match visual characteristics of the segments. The computing device then identifies one or more potential bounding boxes associated with each of the entries. In one embodiment, identifying the one or more potential bounding boxes associated with an entry comprises determining a probability distribution of a plurality of potential bounding boxes. In one embodiment, determining the reduced set of bounding boxes comprises counting a number of occurrences of each potential bounding box and selecting at least one potential bounding box having a highest number of occurrences as the reduced set of bounding boxes.

In one embodiment, for each segment, the computing device computes a similarity measure between the segment and the entry that includes the visual characteristics that most closely match the visual characteristics of the segment. The computing device then weights the one or more potential bounding boxes associated with the entry based on the similarity measure.

In one embodiment, determining the reduced set of bounding boxes comprises, for each bounding box in the initial set of bounding boxes, weighting the bounding box based on a historical usage of the bounding box for at least one of the plurality of segments. The computing device then computes a weighted average from the weighted bounding boxes, wherein the weighted average provides the reduced set of bounding boxes. In one embodiment, determining the initial set of bounding boxes comprises identifying a plurality of entries in a data structure that include visual characteristics that closely match visual characteristics of a segment, and identifying one or more potential bounding boxes associated with each entry. For each potential bounding box of the one or more potential bounding boxes, the computing device then weights the potential bounding box based on a level of similarity between the segment and the entry associated with the potential bounding box.

In one embodiment, the reduced set of bounding boxes comprises a single bounding box. Additionally, the computing device may verify the single bounding box based on performing image analysis of the contents of the single bounding box to determine whether the image analysis confirms an object class for the single bounding box. In one embodiment, the reduced set of bounding boxes comprises a plurality of different bounding boxes for a plurality of different objects in the image. In one embodiment, determining the reduced set of bounding boxes comprises performing regression over the initial set of bounding boxes.

In an embodiment of the present invention, a computing device identifies a training set of images, wherein each image in the training set has an identified bounding box that comprises an object class and an object location for an object in the image. The computing device segments each image of the training set, wherein segments comprise sets of pixels that share visual characteristics, and wherein each segment is associated with an object class. The computing device clusters the segments that are associated with the same object class. The computing device then generates a data structure based on the clustering, wherein entries in the data structure comprise visual characteristics for prototypical segments of objects having the object class and further comprise one or more potential bounding boxes for the objects. The data structure may be usable to predict bounding boxes of additional images that include an object having the object class. In one embodiment, the clustering is performed using a support vector machine.

In one embodiment, the data structure is a codebook, each entry in the data structure is a code word, and each code word comprises a probability distribution over potential bounding boxes. In one embodiment, each entry in the data structure comprises a discrete histogram of bounding boxes associated with a prototypical segment from the training data set. In one embodiment, the computing device determines a weighting value for each entry in the data structure based on a frequency that the segment occurred in the object, wherein each weighting value indicates how strongly the bounding boxes in the entry affect a bounding box prediction. In one embodiment, the computing device generates data structures for a plurality of different object classes.

In additional embodiments, methods for performing the operations of the above described embodiments are also implemented. Additionally, in embodiments of the present invention, a computer readable storage media stores methods for performing the operations of the above described embodiments.

BRIEF DESCRIPTION OF THE DRAWINGS

The present invention will be understood more fully from the detailed description given below and from the accompanying drawings of various embodiments of the invention.

DETAILED DESCRIPTION

Figure 1:
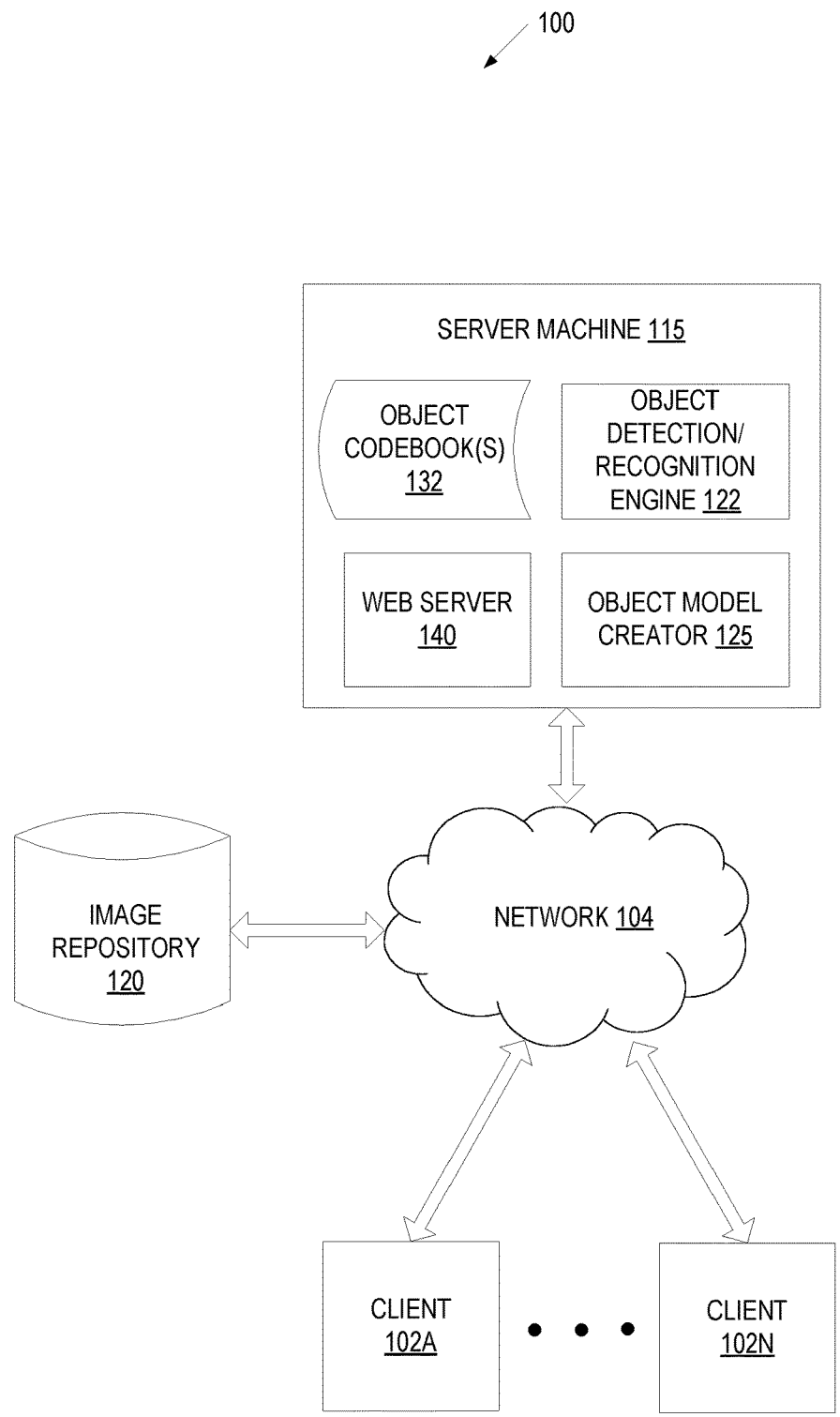
FIG. 1 illustrates an exemplary system architecture, in accordance with one embodiment of the present invention.

A system and method for performing object detection and recognition based on segment localization are described. The system analyses previously classified images by breaking the images down into segments and determining bounding boxes predicted by each segment. When the system receives a new image, it breaks the image down into multiple segments. It determines bounding boxes predicted by each segment. The system then selects bounding boxes that are predicted by the most segments.

In embodiments of the present invention, the system (or method) receives a training set of images in which each image has defined bounding boxes for particular object classes. Examples of object classes include a car, a tree, a person, a face, a building, and so forth. A bounding box of an object is a smallest rectangle that bounds an object in an image. The bounding box may have sides aligned to the image, or may have sides aligned to a shape of the bounded object. The system segments the images into multiple segments. As used herein, a segment is an image region that consists of pixels with common characteristics. Examples of segments include regions of pixels that are all orange, all blue, and so forth. The system performs clustering using the segments of the images to generate segment clusters and/or prototypical segments. A segment cluster is a combination of similar segments across different images, resulting in a prototypical segment. The system then generates a codebook (or other data structure) based on the clustering, where each entry in the codebook represents a segment cluster and includes a set of bounding boxes and/or a bounding box probability distribution. An object codebook is a data structure that contains a set of code words that define an object. Each code word may be an entry in a codebook that represents a prototypical segment (or a segment cluster) that objects of an object class might include. The system may generate a separate codebook for each object class.

Once the codebooks are generated, the system (or a different system) may use the codebooks to perform object detection and/or object recognition. In particular, in one embodiment, upon receiving a new image, the system segments the new image. The system then determines, for each segment of the new image, entries in a codebook that closely match the segment. This may be performed for a codebook of each object class. The system further determines the bounding boxes predicted by each matching entry, and decides that bounding boxes that are predicted by the most matching entries should be used to represent objects in the new image.

Detection presents the problem of finding a correct rectangle in an image. The number of rectangles in an image is extraordinarily large. Embodiments of the present invention reduce the rectangles to search for an object to a very small number of rectangles. Accordingly, embodiments of the present invention provide an accurate and computationally inexpensive technique for performing object detection and object recognition. Embodiments of the present invention may be used to search images and/or to categorize or classify images. For example, embodiments of the present invention may be used to find images with objects in specified configurations, to find images having specified objects, and so on.

Note that embodiments of the present invention are described with reference to images. However, embodiments of the present invention also apply to videos. For example, embodiments of the present invention may perform object detection and object recognition for frames of a video. Alternatively, embodiments of the present invention may combine estimates over multiple frames to perform object detection and recognition.

Note also that embodiments of the present invention are described with reference to bounding boxes. A bounding box is one type of geometric configuration model. It should be understood that embodiments of the present invention may also be used to determine other types of geometric configuration models, such as constellations, k-fans, and so forth. Additionally, embodiments of the present invention are discussed with reference to image segmentation. However, alternative embodiments may perform other types of perceptual grouping, such as contour detection.

FIG. 1 illustrates an example system architecture 100, in accordance with one embodiment of the present invention. The system architecture 100 includes a server machine 115, an image repository 120 and client machines 102A-102N connected to a network 104. Network 104 may be a public network (e.g., the Internet), a private network (e.g., a local area network (LAN) or wide area network (WAN)), or a combination thereof.

The client machines 102A-102N may be personal computers (PC), laptops, mobile phones, tablet computers, or any other computing devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue image search queries to the web server or may browse images and/or videos that have previously been classified. The client machines 102A-102N may also upload images to the web server for storage and/or classification.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 140, an object detection/recognition engine 122 and an object model creator 125. In alternative embodiments, the web server 140, object detection/recognition engine 122 and/or object model creator 125 may run on different machines. Additionally, in some embodiments, the object detection/recognition engine 122 and object model creator 125 may be combined into a single module.

Image repository 120 is a persistent storage that is capable of storing images and/or video. As will be appreciated by those skilled in the art, in some embodiments image repository 120 might be a network-attached file server, while in other embodiments image repository 120 might be some other type of persistent storage such as an object-oriented database, a relational database, and so forth, that may be hosted by the server machine 115 or one or more different machines coupled to the server machine 115 via the network 104. The images and video stored in the image repository 120 may include user generated content that is uploaded by client machines. The images and video may additionally or alternatively include content provided by service providers such as news organizations, publishers, libraries and so on.

Web server 140 may serve images from image repository 120 to clients 102A-102N. Web server 140 may receive image search queries and perform searches on the images in the image repository 120 to determine images that satisfy the image search query. Web server 140 may then send to a client 102A-102N those images that match the search query.

In order for the image repository 120 to be searchable, the images in the image repository 120 may be classified. In one embodiment, object detection/recognition engine 122 classifies the images 126 in the image repository 120. Classifying the images may include performing object detection on the images (identifying the locations of objects in the images) as well as performing object recognition on the objects (determining object classes for those detected objects). The images may then be classified based on the objects that the images contain.

In one embodiment, the object detection/recognition engine 122 uses a set of object codebooks 132 or other data structures to detect objects in images, recognize the objects, and ultimately classify images based on the recognized objects. The object detection/recognition engine 122 operates based on segments within an image. A code word in the object codebook 132 corresponds to a set of features that make up a prototypical segment for a specific object class. In particular, a code word is associated with a set of bounding boxes or a probability distribution of bounding boxes associated with the prototypical segment. Each bounding box in the set or probability distribution includes bounding box dimensions and a bounding box location. In one embodiment, the bounding box dimensions and bounding box location are represented using a bottom left bounding box coordinate relative to the prototypical segment and a top right bounding box coordinate relative to the prototypical segment. Note that in alternative embodiments, other data structures than codebooks may be used, such as tables or collections of key value pairs.

To classify an image, object detection/recognition engine 122 may segment the image and determine segments of the image that match entries for prototypical segments in an object codebook. The object detection/recognition engine 122 may then determine a bounding box (or multiple bounding boxes) that are predicted by the most segments. Once a bounding box is determined, object detection/recognition engine 122 decides that an object class and an object location in the image have been identified. This information may then be used to classify the image.

To enable object detection/recognition engine 122 to identify and recognize objects in images, and thus to classify images, object model creator 125 may pre-generate object codebooks 132 or other data structures. In particular, object model creator 125 may receive a training set of images. In one embodiment, each image in the training set includes a specified bounding box for a particular object class. Alternatively, objects included in images are labeled, but specific bounding boxes for those objects are not identified. The images from the training set may be included in the image repository 120 or may be in a separate data store. Object model creator 125 segments images from the training set and performs clustering and/or vector machine learning on the segments. Each segment cluster may be used to generate an entry (e.g., a code word) in a codebook for an object of a particular object class. Embodiments of codebook generation are discussed in greater detail below with reference to FIG. 2. Object detection and recognition using a set of codebooks is discussed with reference to FIG. 3.

Figure 2:
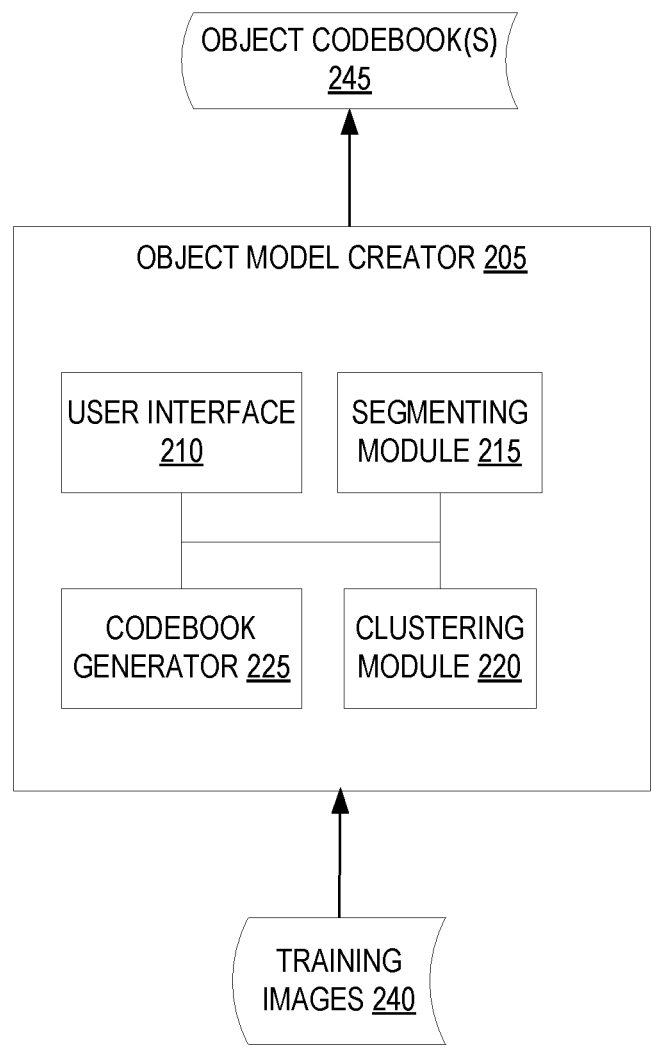
FIG. 2 is a block diagram of an object model creator, in accordance with one embodiment of the present invention.

FIG. 2 is a block diagram of an object model creator 205, in accordance with one embodiment of the present invention. The object model creator 205 includes a user interface 210, a segmenting module 215, a clustering module 220 and a codebook generator 225. Note that in alternative embodiments, the functionality of one or more of the user interface 210, segmenting module 215, clustering module 220 and/or codebook generator 225 may be combined into a single module or divided into multiple modules.

Segmenting module 215 segments each image in a training set of images 240. A user (e.g., an administrator) may specify the training images 240 (e.g., by designating a location that contains the training images 240) via the user interface 210. Images may be added to the training data set as discreet files (e.g., joint photographic experts group (JPEG) files, graphics interchange format (GIF) files, portable network graphics (PNG) files, etc.) or as components of a single compressed file (e.g., a zip file).

As discussed above, a segment is a region that consists of pixels with similar characteristics. A characteristic may pertain to color, and may reflect color variation within a region. For example, a region of homogeneous color will remain distinct from a region having pixels of a different color. A characteristic may also pertain to other features such as intensity, texture, etc. A segment may include identifying information such as the position of the segment within an image (e.g., using "x" and "y" axes), the size and/or geometric shape of the segment, a color value (or multiple color values) associated with the segment, an intensity of the segment, a texture of the segment, and so on. In one embodiment, segments are represented as a vector with a color, a texture and/or additional image properties.

There are multiple techniques that may be used to segment images. One such technique is described herein. However, numerous other techniques for image segmentation may also be used. In one embodiment, segmenting module 215 performs filtering (e.g., bilateral filtering) of images prior to segmenting the images in order to improve the segmentation process by causing the segments to be more homogenous.

In one embodiment, segmenting module 215 generates a hierarchical segmentation of images. Higher levels of the hierarchy may describe relatively coarse segmentations of an image while lower levels of the hierarchy may describe relatively fine segmentations of the image. Segmenting parameters may affect aspects of segmentation such as the number of levels of the segmentation hierarchy and the granularity of the segmentations at the levels of the hierarchy. Segmenting module 215 may perform the hierarchical segmentation via an iterative process, where each iteration produces a segmentation for a level of the segmentation hierarchy.

During a first iteration, segmenting module 215 may generate a segmentation graph, where each node of the segmentation graph contains a single pixel. Segmenting module 215 may then use an intensity of that single pixel as a descriptor for the node. During subsequent iterations, segmenting module 215 segments a graph (e.g., the segmentation graph or a region graph) to produce a new region graph segmented into larger regions. Collectively, the set of graphs forms a hierarchy, with each level of the hierarchy having a graph with a different segmentation.

For region graphs, nodes of the region graph can contain multiple pixels. For these nodes, segmenting module 215 may compute a histogram describing the colors of pixels within the region defined by the node and use the histogram as the node's descriptor or vector. In one embodiment, the histogram describes the red/green/blue (RGB) intensities of the pixels within the region, though other color spaces may also be used.

The segmentation module 215 may perform the segmentation by determining the internal variation of the nodes, traversing the edges of the nodes in order of increasing weight, and evaluating whether the edge weight is smaller than the internal variation of both nodes incident to the edge. If the edge weight is smaller, the nodes may be merged together and the internal variation of the compound node may be updated to the larger of the internal variations of the two merged nodes. The segmentations produced by the segmenting server 112 can be used to support subsequent processing of the images (e.g., by clustering module 220).

Clustering module 220 performs clustering on segments from images to generate segment clusters. Each segment cluster is a group of segments that are more similar to each other than to segments from other segment clusters. In one embodiment, clustering is performed on an object class basis. Therefore, each segment cluster represents a prototypical segment for an object of a particular object class that is bounded by a bounding box. Segment clusters may be represented by a vector that may include a color, intensity, texture and/or other image properties. Segment clusters may be represented by averages of features of the segments in the segment cluster and/or by median features (e.g., median color, intensity, etc.). Segment clusters may additionally include feature value ranges. Segments having features that fall within the feature value ranges may be identified as belonging to the segment cluster.

There are numerous clustering techniques that may be used to perform the clustering. Examples of clustering techniques that may be used include clustering techniques based on connectivity models (e.g., hierarchical clustering), based on centroid models (e.g., using the k-means algorithm), based on distribution models (e.g., using multivariate normal distributions), based on density models, and based on subspace models (e.g., using biclustering).

In one embodiment, rather than expressly performing clustering, clustering module 220 may train a regression system to predict bounding boxes. The regression system may identify image features or segments and linearly or non-linearly combine them to produce an output parameterization of bounding boxes. In one embodiment, clustering module 220 discretely quantizes the space of relative locations between segments and bounding boxes. Clustering module 220 can then set up a scoring problem in which, given a segment, a set of scores for bounding boxes is produced for the segment. In one embodiment, clustering module 220 uses a support vector machine (SVM) in which a radial basis function (RBF) is used as a kernel to train a regression system. In such an embodiment, discretized bounding box coordinates are used as labels for the radial basis function. In such an embodiment, clustering and kernel function learning becomes implicit and is done automatically as part of SVM training. Additionally, an SVM may be trained to determine a reduced set of bounding boxes from an initial set of bounding boxes.

Each segment from an image is at least partially contained within a bounding box. The bounding box has a size and coordinates relative to the segment. Given a bounding box and a segment, a geometric embedding of the segment within the bounding box may be defined as a function that maps segments to bounding boxes. For example, a function $f: S \times P \rightarrow B$ may be defined, where S is the space of segment descriptors, P is the positional parameter for a segment, and B is the bounding box parameters. For a particular segment, the bounding box may be represented by the function $b=f(s,p)$, where b is the bounding box predicted by segment s (represented by a descriptor that pools features local to that segment), and p is the position of s relative to which b is defined. In one embodiment, the coordinates of the bounding box are relative to a center of the segment (e.g., to a pixel at the center of the segment).

Each segment cluster is associated with the bounding boxes that bounded the segments included in the segment cluster. In one embodiment, the bounding boxes are stored as a histogram of bounding boxes. For example, if a particular bounding box was found to bound 10 different segments in a segment cluster, then the histogram may include a value of 10 for that bounding box. In another embodiment, the bounding boxes are scored based on observed frequencies of the bounding boxes with regards to segments clusters. The bounding boxes may then be stored as discrete units along with the generated scores. In another embodiment, the bounding boxes are stored as a probability distribution. The probability distribution may be represented by a discrete or continuous function $f(s,p,b)=Pr(b|s,p)$ that maps segments to bounding boxes. Those bounding boxes that occurred frequently in the segments of the segment cluster would be given a high probability by the probability function, while those bounding boxes that only occurred for a few segments of the segment cluster would be given a low probability by the probability function.

While the space of bounding boxes B is compact and well behaved, the space of segment descriptors S can be quite large and sparse. In a bag-of-words model, S consists of histograms of features computed by accumulating features within the segments of a segment cluster. This can be generalized by approximating S with a vocabulary of segment clusters C=[c1, c2, . . . , cn]. Each segment is then simply an index or a sparse vector indicating which segment cluster it belongs to. This can be softened to include k-nearest clusters, or more generally be represented as a kernel function (a continuous, symmetric function with a positive semi-definite gram matrix that replaces a dot product between two vectors to transform a linear algorithm into a non-linear algorithm) which assigns membership of a segment to these clusters. For example, descriptor(s):=[K(s,c1), K(s,c2), . . . , K(s,cn)] may be computed, where K is the kernel function. Examples of kernel functions include a linear kernel, a polynomial kernel, a Gaussian kernel, an exponential kernel, a laplacian kernel, and so on. If each segment cluster defines its own bounding box predictor distribution ƒk, then the bounding box distribution from an observed segment may be computed as ƒ(s,p,b)\prop Sum_k{K(s,ck)*ƒk*wk}, where the weight wk denotes an object-class-specific prior weight, which measures the reliability of cluster k's bounding box predictor ƒk. Learning the function ƒ may involve identifying the segment clusters as well as kernel functions and bounding box distributions for each segment cluster.

Codebook generator 225 generates a codebook (or other data structure) from the segment clusters. Each segment cluster associated with an object class may be represented by a code word in the codebook. The code word includes the descriptor or vector that describes the segment cluster. The descriptor or vector may include a color (or color range), an intensity (or intensity range), a texture (or texture range), and so forth. Each code word may additionally include or be associated with a set of bounding boxes associated with the segment cluster. The set of bounding boxes may be represented as a discrete or continuous bounding box probability function, by a bounding box histogram or by a collection of scored bounding boxes. Each code word may additionally include a kernel function that can be used to assign membership of a segment to the code word. In one embodiment, code words are arranged in the codebook hierarchically based on the hierarchy level of the prototypical segments that they represent.

A separate codebook may be generated for each object class. For example, a first codebook may be generated to detect and classify car objects, a second codebook may be generated to detect and classify tree objects, a third codebook may be generated to detect and classify building objects, and so on. Once object codebooks 245 are generated, object model creator 205 may deploy the object codebooks 245 to servers.

In one embodiment, object model creator 205 periodically recomputes the object codebooks 245. This may include invoking the segmenting module 215, the clustering module 220 and the codebook generator 225. As objects are identified in new images, those new images may be added to the training set of images. The updated training set of images may then be used to recompute the object codebooks 245. In one embodiment, the object model creator 205 uses all of the previous contents of the training set of images as well as the newly added training images 240. In another embodiment, the object model creator 205 uses only the recently added training images 240.

Figure 3:
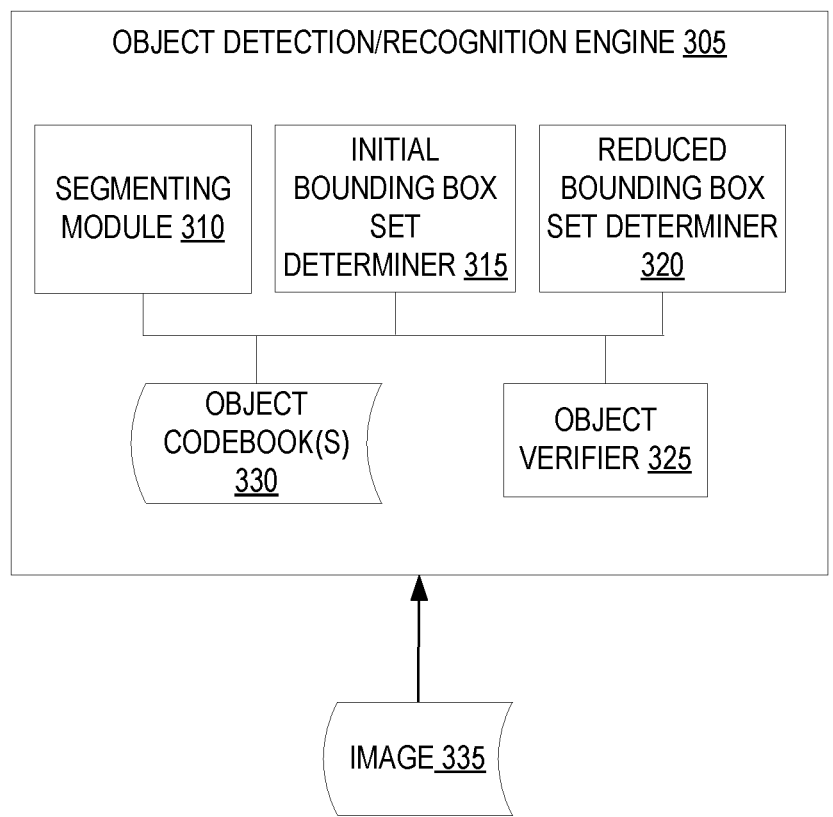
FIG. 3 is a block diagram of an object detection/recognition engine, in accordance with one embodiment of the present invention.

FIG. 3 is a block diagram of an object detection/recognition engine 305, in accordance with one embodiment of the present invention. The object detection/recognition engine 305 includes a segmenting module 310, an initial bounding box set determiner 315, a collection of object codebooks 330 and a reduced bounding box set determiner 320. Object detection/recognition engine 305 may also include an object verifier 325. Note that in alternative embodiments, the functionality of one or more of the segmenting module 310, initial bounding box set determiner 315, reduced bounding box set determiner 320 and/or object verifier 325 may be combined into a single module or divided into multiple modules.

Object detection/recognition engine 305 is configured to perform object detection and object recognition on images 335. Object detection/recognition engine 305 may receive an image 335 from a remote machine such as a client machine or third party server machine. Alternatively, object detection/recognition engine 305 may access an image 335 from an image repository residing remotely or locally.

Segmenting module 310 segments an image 335 that is to be analyzed. Segmenting module 310 may segment the image using the same technique that was used to generate the object codebooks 330. Alternatively, segmenting module 310 may use a different segmenting technique to segment the image. Any of the aforementioned segmenting techniques may be used. As previously mentioned, each segment may be represented as a vector or descriptor that includes a position of the segment within an image (e.g., a position of a center pixel of the segment using "x" and "y" axes), a size and/or geometric shape of the segment, a color value (or multiple color values) associated with the segment, an intensity of the segment, a texture and/or additional image properties. Additionally, hierarchical segments may be generated, as previously described. For example, if a segment is a wheel, it may have sub-segments for a hubcap, for a tire, for tire treads, and so forth.

Initial bounding box set determiner (IBBD for short) 315 determines an initial bounding box set for the image 335 based on the segments. To determine the initial bounding box set, IBBD 315 compares each segment to code words in the object codebooks 330. Each match of a segment to a code word in a particular object codebook may be recorded. A segment may match a code word in an object codebook 330 if the segment includes features (e.g., color, texture, intensity, shape, etc.) that match features of a prototypical segment represented by the code word. A match may be an exact correspondence between features, but will usually be a correspondence within deviation thresholds. The deviation thresholds may be defined individually for each code word, or may be defined globally and apply to all code words in a codebook.

As previously mentioned, each code word includes a set of bounding boxes. This set of bounding boxes may be represented as a histogram, a distribution function, or simply as a table or list of bounding boxes. Each bounding box has a size and location relative to the prototypical segment (segment cluster) represented by a code word. Bounding box size may be absolute size or may be size relative to a size of the prototypical segment. Each bounding box may also have an associated object class. The object class for a bounding box may be inherent from the object codebook 330 that the bounding box is contained in. For each codebook 330, IBBD 315 determines the bounding boxes associated with code words that match segments from the image 335. This may include transforming bounding boxes from a coordinate system relative to prototypical segments to a coordinate system relative to a position on the image 335. Each such bounding box is a potential bounding box for an object in the image 335. The initial bounding box set may include bounding boxes of all code words that match segments for a particular object codebook 330. The initial bounding box set may additionally include bounding boxes of code words of all object codebooks 330 that match segments from the image 335.

Once the initial bounding box set is determined, reduced bounding box set determiner (RBBD for short) 320 reduces the initial bounding box set to a reduced set of a single bounding box or a few bounding boxes. RBBD 320 generates the reduced bounding box set by combining the bounding boxes from the initial bounding box set. This combination may be a weighted or a non-weighted combination of bounding boxes.

In one embodiment, the potential bounding boxes associated with code words are represented as histograms. Each bin of a histogram is for a particular bounding box with a particular bounding box size and location relative to the segment cluster of the code word. The value in a histogram bin may represent the number of instances in which the bounding box bounded a segment in the segment cluster represented by the code word. For example, if there were 100 images that included a segment in a particular code word's segment cluster, and 5 of those instances of the segment had a particular bounding box, then that bounding box may have a bin value of 5. The bin values may be normalized for uniformity between histograms.

Combining bounding boxes from the initial bounding box set may include combining bin values of each of the histograms. Bounding boxes associated with histogram bins having the highest bin values may then be selected by the reduced bounding box set determiner as the reduced bounding box set. In one embodiment, histogram bins having bin values that exceed a bin value threshold are included in the reduced bounding box set.

In another embodiment, the potential bounding boxes associated with code words are probability distributions on bounding boxes. Each probability distribution predicts a particular bounding box or bounding boxes. The bounding boxes from the initial bounding box set may be combined by summing up the probability distributions associated with each code word that matched a segment of the image. If multiple segments indicate that the probability of a particular bounding box is high, then the chance that the particular bounding box bounds an object in the image is increased. Bounding boxes having the highest probability after combining the probability distributions may be selected for the reduced set of bounding boxes. Additionally, or alternatively, bounding boxes having a probability that exceeds a probability threshold and that are local maximums are selected for the reduced set of bounding boxes.

In another embodiment, the potential bounding boxes associated with code words are discrete bounding boxes having bounding box scores. A higher score may reflect a higher probability that a particular bounding box will occur in association with a particular segment. A particular bounding box may be associated with multiple different code words, and may have a different bounding box score for each code word. Combining bounding boxes may comprise identifying multiple code words that predicted a particular bounding box and adding together the scores for the bounding box associated with those code words. The may be performed for each bounding box from the initial set of bounding boxes.

In one embodiment, the combination of bounding boxes from the initial set of bounding boxes is a weighted combination. Bounding boxes may be weighted based on multiple factors. In one embodiment, each code word in an object codebook 330 for an object class has a weighting factor that is based on the frequency with which the prototypical segment represented by the code word appears in objects of the object class. For example, if a particular prototypical segment only occurs in a particular object class 5% of the time, then a weighting factor of 0.05 may be assigned to the code word for that prototypical segment.

In some instances, a particular segment of the image 335 may not directly match any code word in an object codebook 330. In one embodiment, when this occurs a partial match is identified for one or more code words in the object codebook 330. The partial match includes a similarity score that indicates a degree of similarity between the segment and the prototypical segment represented by a code word. Bounding boxes associated with the code word may then be weighted based on the similarity score.

In one embodiment, code words for prototypical segments are associated with a hierarchy level. Bounding boxes may be weighted based on the hierarchy level of the code words that they are associated with.

In one embodiment, the RBBD 320 inputs the initial set of bounding boxes into a machine learning system. The machine learning system may then determine the reduced set of bounding boxes.

It should be noted that an image may include multiple different objects. For example, an image may contain a car, a road, a tree and a person. The reduced bounding box set may include a separate bounding box for each of the objects in the image.

Once a reduced bounding box set is determined, if there are no conflicts between the bounding boxes of the reduced bounding box set, then the reduced bounding box set may be used to both detect the objects of the image and to categorize (recognize) those objects. For example, the peaks of the combined probability distributions may be identified as bounding boxes. If there is conflict between the bounding boxes in the reduced bounding box set (e.g., if there is an equal probability that two different bounding boxes are in the image, but the image cannot contain both bounding boxes), then object verifier 325 may perform object verification on the contents of the bounding boxes. Object verifier 325 may additionally perform object verification when there is no conflict between bounding boxes.

In one embodiment, the object verifier 325 treats each bounding box as an independent image. Object verifier then extracts image features (e.g., performs segmentation) and performs image classification or object recognition on the image within the bounding box. In one embodiment, the techniques described herein are performed on the image within the bounding box to perform object recognition. Any of the image classification and/or object recognition techniques known in the art may also be used. Performing image classification or object recognition on just the contents of the bounding box is much simpler than performing image classification or object recognition on the entire image. Therefore, well known techniques for performing these operations can be performed with increased accuracy.

Figure 4A:
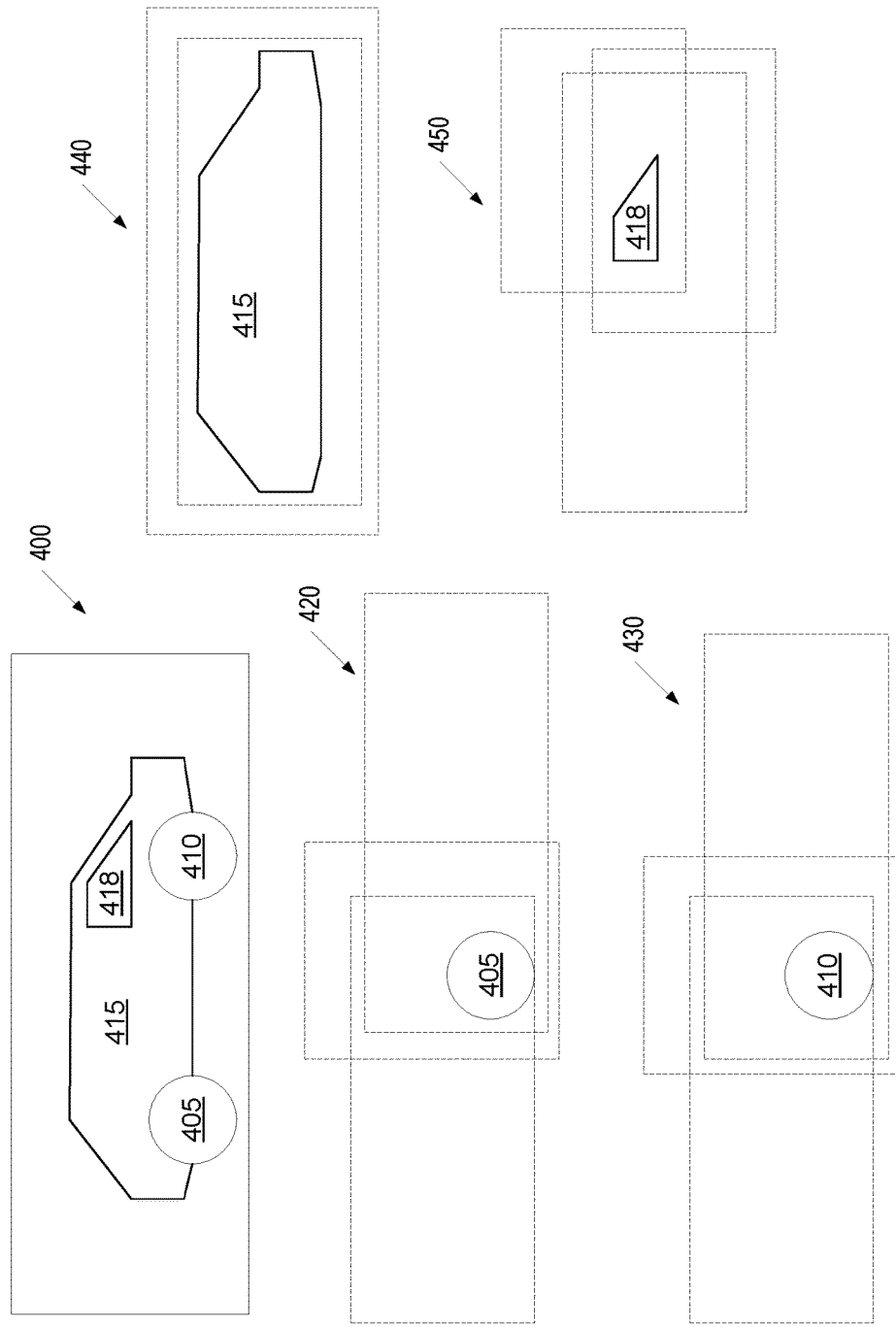
FIG. 4A illustrates an example segmented image, as well as bounding boxes predicted by specific segments of the example image, in accordance with one embodiment of the present invention.

FIG. 4A illustrates an example segmented image 400, as well as bounding boxes 420-450 predicted by some specific segments, in accordance with one embodiment of the present invention. The segmented image 400 includes a segment 405, a segment 410, a segment 415 and a segment 418. Each segment 405-418 may correspond to a code word in an object code book. Bounding boxes 420 are associated with segment 405. These bounding boxes may be identified, for example, by finding a code word in an object codebook for a car object class. Similarly, bounding boxes 430 are associated with segment 410, bounding boxes 440 are associated with segment 415, and bounding boxes 450 are associated with segment 418.

Figure 4B:
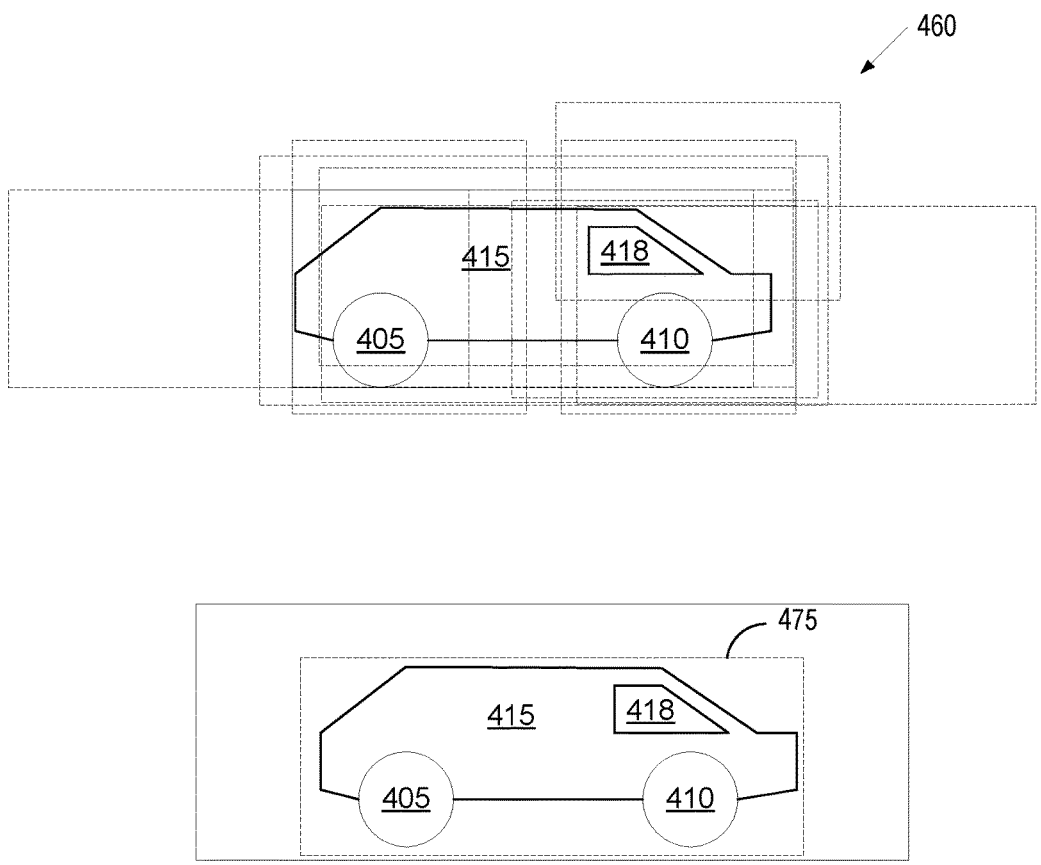
FIG. 4B illustrates an initial set of bounding boxes that combines the bounding boxes of FIG. 4A, as well as a single bounding box that results from combining the bounding boxes, in accordance with one embodiment of the present invention.

FIG. 4B illustrates an initial set of bounding boxes that combines the bounding boxes of FIG. 4A, in accordance with one embodiment of the present invention. The illustrated combination represents a linear, non-weighted combination of bounding boxes. FIG. 4B further illustrates the image 400 of FIG. 4A with a single bounding box 475 that results from combining the bounding boxes in the initial set of bounding boxes. These bounding boxes may be combined by counting the number of occurrences of each of the bounding boxes in the initial set of bounding boxes. The bounding box (or bounding boxes) that has the most occurrences may then be selected as a reduced set of bounding boxes. Note that bounding boxes that differ by less than a threshold amount may be considered to be occurrences of the same bounding box. The reduced set of bounding boxes may be a single bounding box or multiple bounding boxes. As illustrated, the single resultant bounding box bounds a car object.

FIGS. 5-9 are flow diagrams of various embodiments of methods for generating data structures for performing object recognition and for using such data structures to perform object recognition. The methods are performed by processing logic that may comprise hardware (circuitry, dedicated logic, etc.), software (such as is run on a general purpose computer system or a dedicated machine), or a combination of both. In one embodiment, the methods are performed by the server machine 115 of FIG. 1. The methods of FIG. 5-6 may be performed by an object model creator 125 running on server machine 115 or another machine. The methods of FIGS. 7-9 may be performed by an object detection/recognition engine 122 running on the server machine 115 or an additional machine. Note that the object detection/recognition engine 122 and the object model creator 125 may run on separate machines.

Figure 5:
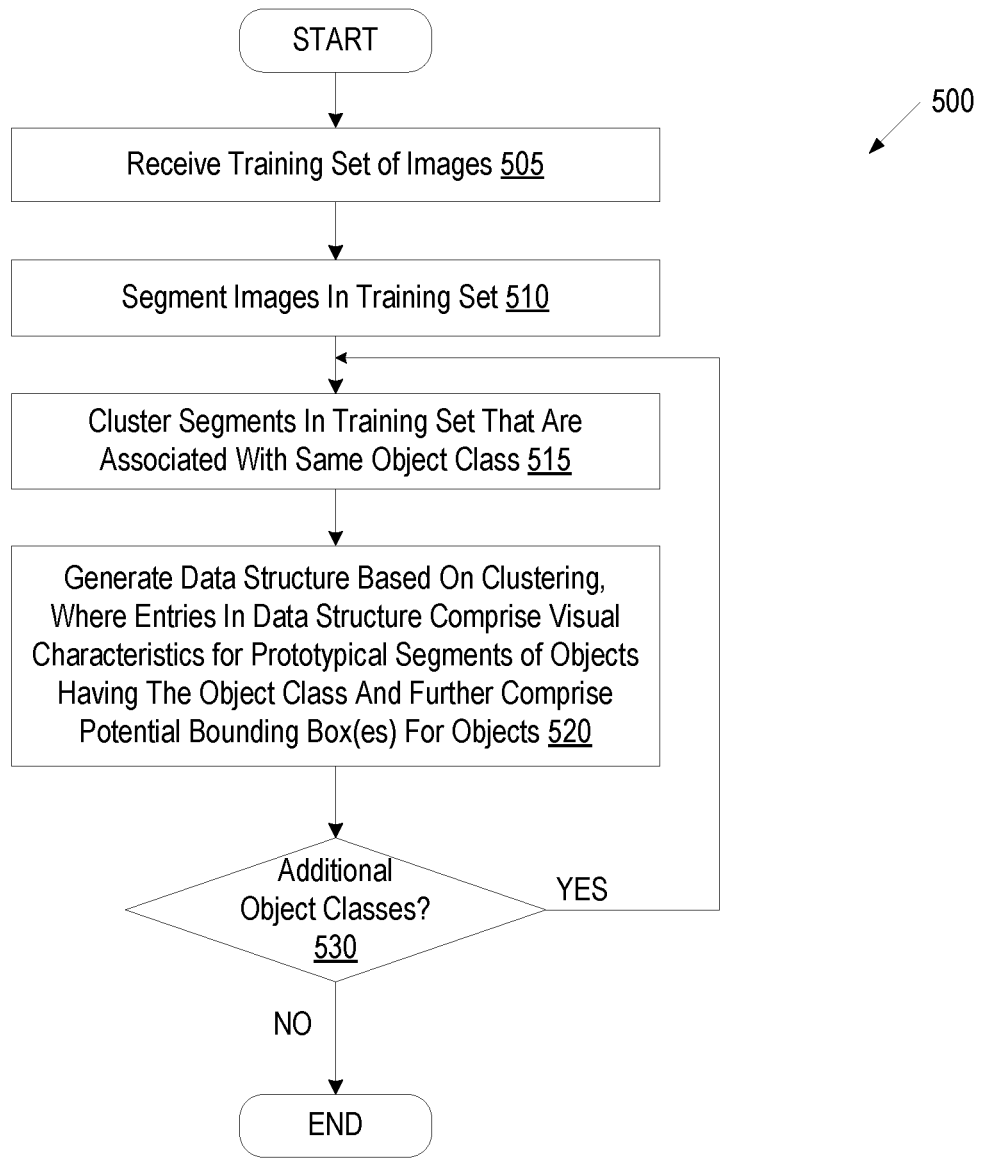
FIG. 5 is a flow diagram illustrating one embodiment for a method of generating a data structure for performing object recognition.

FIG. 5 is a flow diagram illustrating one embodiment for a method 500 of generating a data structure for performing object recognition. In one embodiment, the generated data structure is a codebook. Alternatively, the data structure may be a table, list, collection of key value pairs, or other type of data structure. At block 505 of method 500, processing logic receives a training set of images. Each image in the training set is classified as containing an object of a particular object class (or multiple objects of one or multiple object classes). Images may additionally have predefined bounding boxes that bound objects of specific object classes.

At block 510, processing logic segments the images in the training data set. Any segmenting technique known in the art of image processing may be used to perform the segmentation. In one embodiment, a hierarchical segmentation technique is performed, as previously described. Each generated segment may be associated with a bounding box of a particular object class that bounds the segment.

At block 515, processing logic clusters the segments in the training data set that are associated with the same object class. Any of the previously discussed clustering techniques may be used to perform the clustering. A result of the clustering may be a collection of segment clusters, where each segment cluster includes visual characteristics (also referred to as features) such as color, intensity, size, texture, etc. of a prototypical segment.

At block 520, processing logic generates a data structure based on the clustering. Entries in the data structure include visual characteristics for prototypical segments (or segment clusters) of objects having the object class. Entries in the data structure additionally include multiple potential bounding boxes. Each potential bounding box may bound an object that the segment is a component of. The potential bounding boxes for an entry may be represented as a histogram of bounding boxes, as a probability distribution over bounding boxes, or as a set of discrete bounding boxes having bounding box scores.

At block 530, processing logic determines whether the training set of images includes any object classes for which data structures have not yet been generated. If there are any object classes for which data structures have not yet been generated, the method returns to block 515. Otherwise, the method ends.

Figure 6:
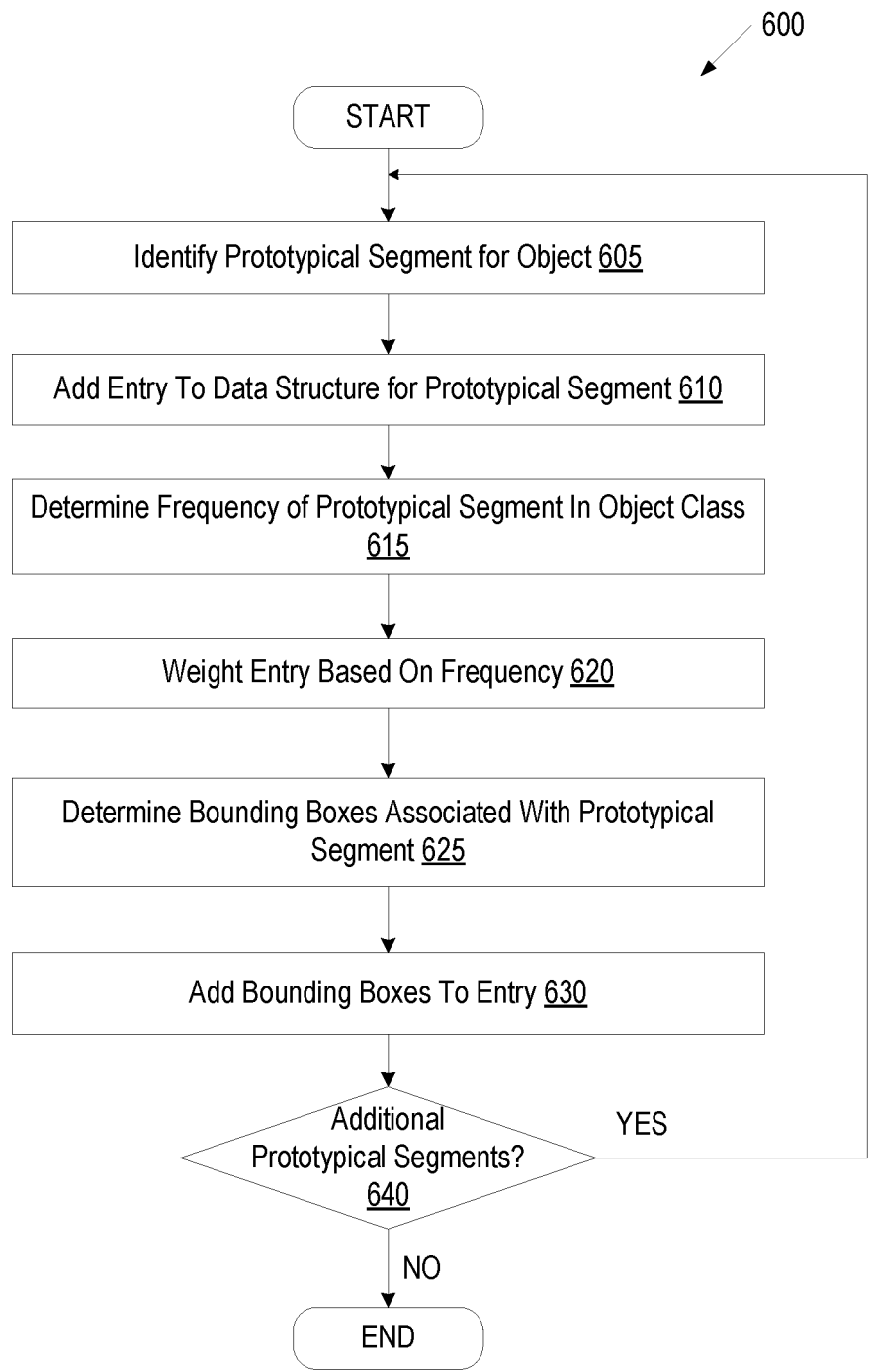
FIG. 6 is a flow diagram illustrating another embodiment for a method of generating a data structure for performing object recognition.

FIG. 6 is a flow diagram illustrating another embodiment for a method 600 of generating a data structure for performing object recognition. In one embodiment, method 600 is performed at block 520 of method 500. At block 605 of method 600, processing logic identifies a prototypical segment for a class of object. The prototypical segment may have been generated by performing clustering on segments of a set of training images. At block 610, processing logic generates a data structure for the class of object, and adds an entry to the data structure for the prototypical segment.

At block 615, processing logic determines a frequency of the prototypical segment in the class of object. The frequency may be determined from the training set of images. For example, if the training set of images had 100 instances of the object class, and 80 of those instances included a segment similar to the prototypical segment, then the frequency for that prototypical segment would be defined as 80%. At block 620, processing logic weights the entry based on the determined frequency. Continuing the previous example, a weight of 0.8 may be assigned based on the frequency of 80%.

If a hierarchical segmentation technique was performed to segment the images, then a segment hierarchy level may be associated with an entry in the data structure. In one embodiment, processing logic weights entries based on a segment hierarchy level associated with the entries. For example, entries for high level prototypical segments may be assigned a large weight and entries for low level prototypical segments may be assigned a small weight.

At block 625, processing logic determines bounding boxes associated with the prototypical segment. This may include generating a histogram of bounding boxes and/or a probability distribution of bounding boxes. Alternatively, a set of discrete bounding boxes may be defined for the entry, and a separate weight may be assigned to each bounding box in the set. The weight assigned to a bounding box may be based on the frequency at which the bounding box occurred for the segment in the training set of images. At block 630, processing logic adds the bounding boxes to the entry.

At block 640, processing logic determines whether there are any additional prototypical segments that need to be added to the data structure. If there are additional prototypical segments, the method returns to block 605. Otherwise the method ends.

Figure 7:
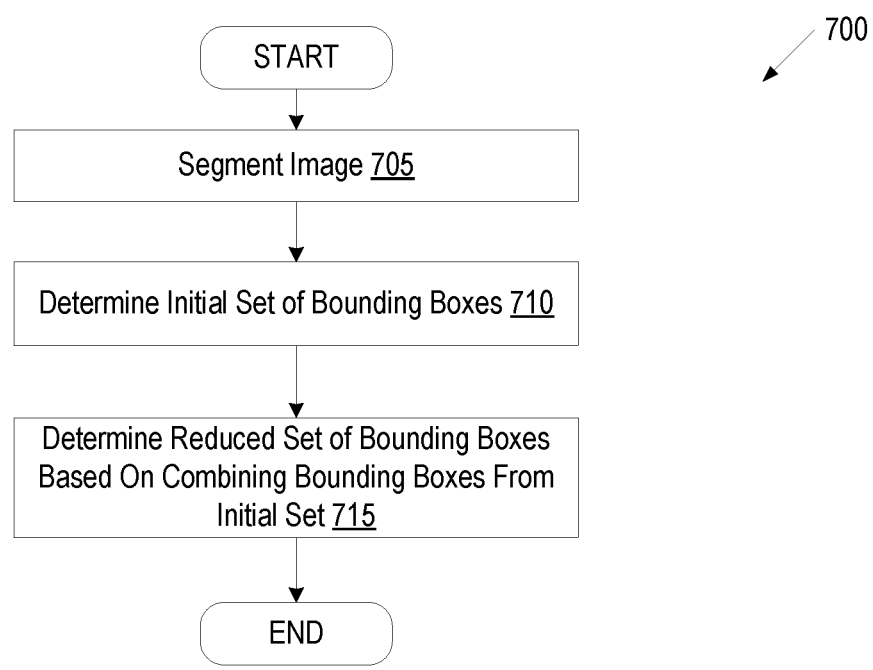
FIG. 7 is a flow diagram illustrating one embodiment for a method of performing object recognition based on segment localization.

FIG. 7 is a flow diagram illustrating one embodiment for a method 700 of performing object recognition based on segment localization. At block 705 of method 700, processing logic segments an image as previously described. At block 710, processing logic determines an initial set of bounding boxes for the image based on the segments. In one embodiment, as set forth in FIG. 8, a data structure such as a code book is used to determine the initial set of bounding boxes.

At block 715, processing logic determines a reduced set of bounding boxes based on combining the bounding boxes from the initial set. The combination may be a linear combination such as a weighted or unweighted sum of bounding box probabilities. The reduced set of bounding boxes identifies detected objects in the image and further identifies object classes for those objects. Therefore, method 700 may be used to perform both object detection and object recognition.

Figure 8:
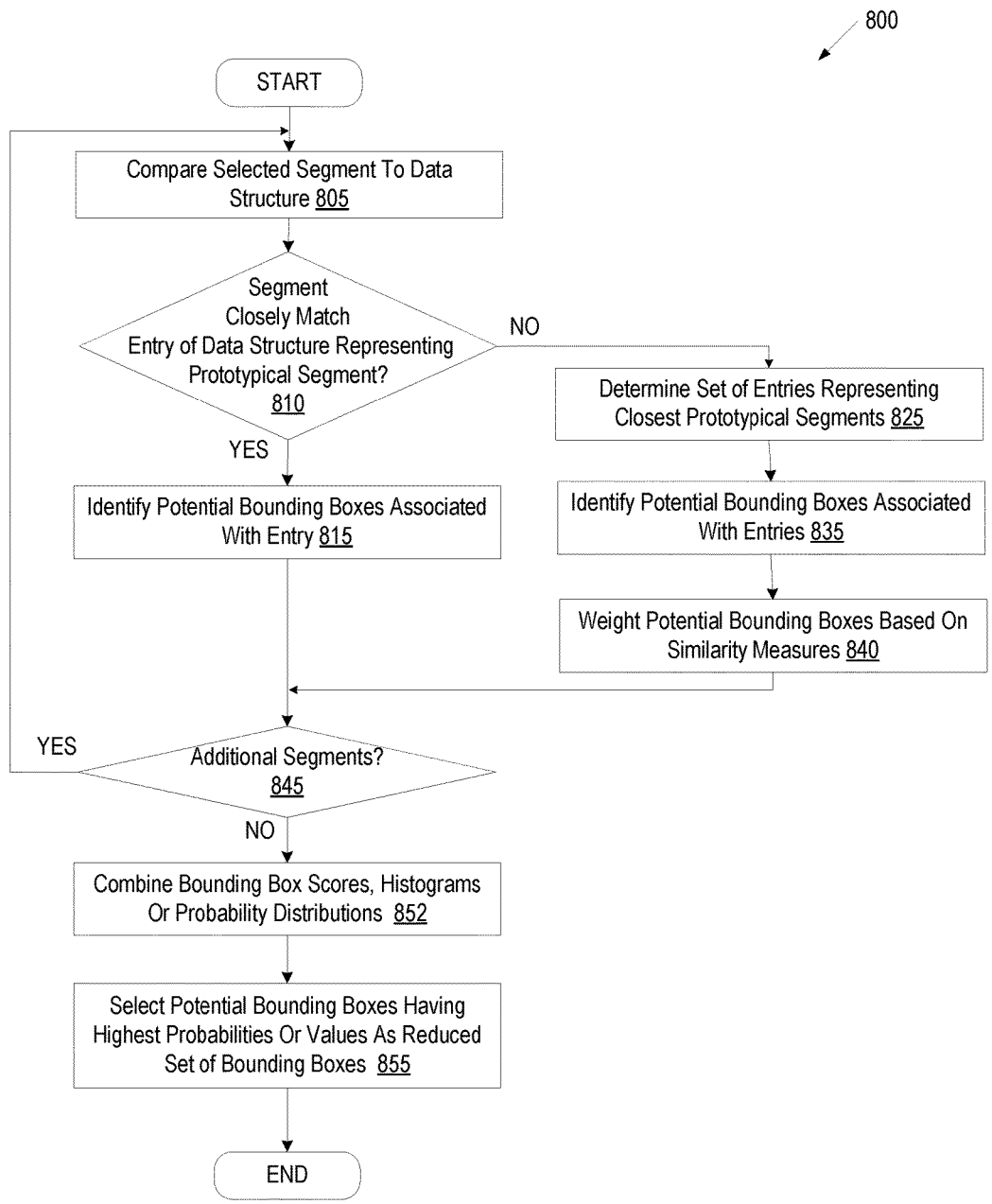
FIG. 8 is a flow diagram illustrating another embodiment for a method of performing object recognition based on segment localization.

FIG. 8 is a flow diagram illustrating another embodiment for a method 800 of performing object recognition based on segment localization. In one embodiment, method 800 is performed by blocks 710 and/or 715 of method 700. At block 805 of method 800, processing logic compares a selected segment of an image to a data structure (e.g., to a codebook). The segment may have been determined through performing segmentation on the image. At block 810, processing logic determines whether the segment closely matches an entry of the data structure, where the entry represents a prototypical segment of a particular object class. In one embodiment, the segment is determined to closely match an entry if a descriptor or vector that describes the segment is within a threshold deviation from a descriptor or vector that describes the prototypical segment associated with an entry. Vectors for segments and prototypical segments may have values for color, intensity, texture, shape, size, and/or other features. In one embodiment, the difference between two segments may be computed as the Euclidian distance between the vectors for those segments. If the Euclidean distance between a segment's vector and a prototypical segment's vector exceeds a distance threshold, then processing logic may determine that the segment and the prototypical segment do not closely match. In alternative embodiments, other similarity measures representing differences between two segment vectors may be computed. If the segment does not closely match any entry in the data structure, the method proceeds to block 825. If the segment does closely match any entry, the method continues to block 815 and processing logic identifies potential bounding boxes associated with the entry.

At block 825, processing logic determines a set of entries representing prototypical segments that most closely match the selected segment. To make such a determination, a Euclidean distance (or other similarity measure) between the segment's vector and a prototypical segment's vector may be computed for each entry. Entries having prototypical segments with the shortest Euclidean distances (or highest similarity measure) from the selected segment may be identified as those entries representing the closest prototypical segments.

At block 835, processing logic identifies potential bounding boxes associated with the determined entries. At block 840, processing logic weights the potential bounding boxes based on the similarity measures between the entries and the selected segment. For example, bounding boxes associated with entries that had a short Euclidean distance between the segment's vector and a prototypical segment's vector may be assigned a high weight (e.g., 0.8), and bounding boxes associated with entries that had a long Euclidean distance between the segment's vector and a prototypical segment's vector may be assigned a low weight (e.g., 0.4).

At block 845, processing logic determines whether there are additional segments that need to be compared to the data structure. If so, the method returns to block 805. Otherwise, the method continues to block 850.

Each bounding box in an entry of the data structure may have a score that represents a likelihood that a particular segment is bounded by the bounding box. Alternatively, entries may include bounding box histograms or probability distributions of bounding boxes. The scores, histograms or probability distributions may identify, for each bounding box associated with a prototypical segment, a likelihood that the bounding box bounds a matching selected segment. In many instances, one or more of the same bounding boxes will be identified by multiple different selected segments. At block 852, processing logic combines the potential bounding boxes (e.g., combines potential bounding box scores, histograms or probability distributions) identified by the multiple segments. For example, if a bounding box histogram of a first segment had a bin value of 6 for a particular bounding box and a bounding box histogram of a second segment had a bin value of 8 for the particular bounding box, then combining the bounding boxes would yield a bin value of 14 for that particular bounding box. However, if the bounding box histogram of the first segment was weighted with a weight of 0.5, then the combining the bounding boxes would yield a bin value of 6*0.5+8=11.

At block 855, processing logic selects one or more potential bounding boxes having highest probabilities or values as a reduced set of bounding boxes. For example, if five bounding boxes have bin values of 4 and one bounding box has a bin value of 100, then the bounding box having the bin value of 100 would be selected as the reduced set of bounding boxes.

Figure 9:
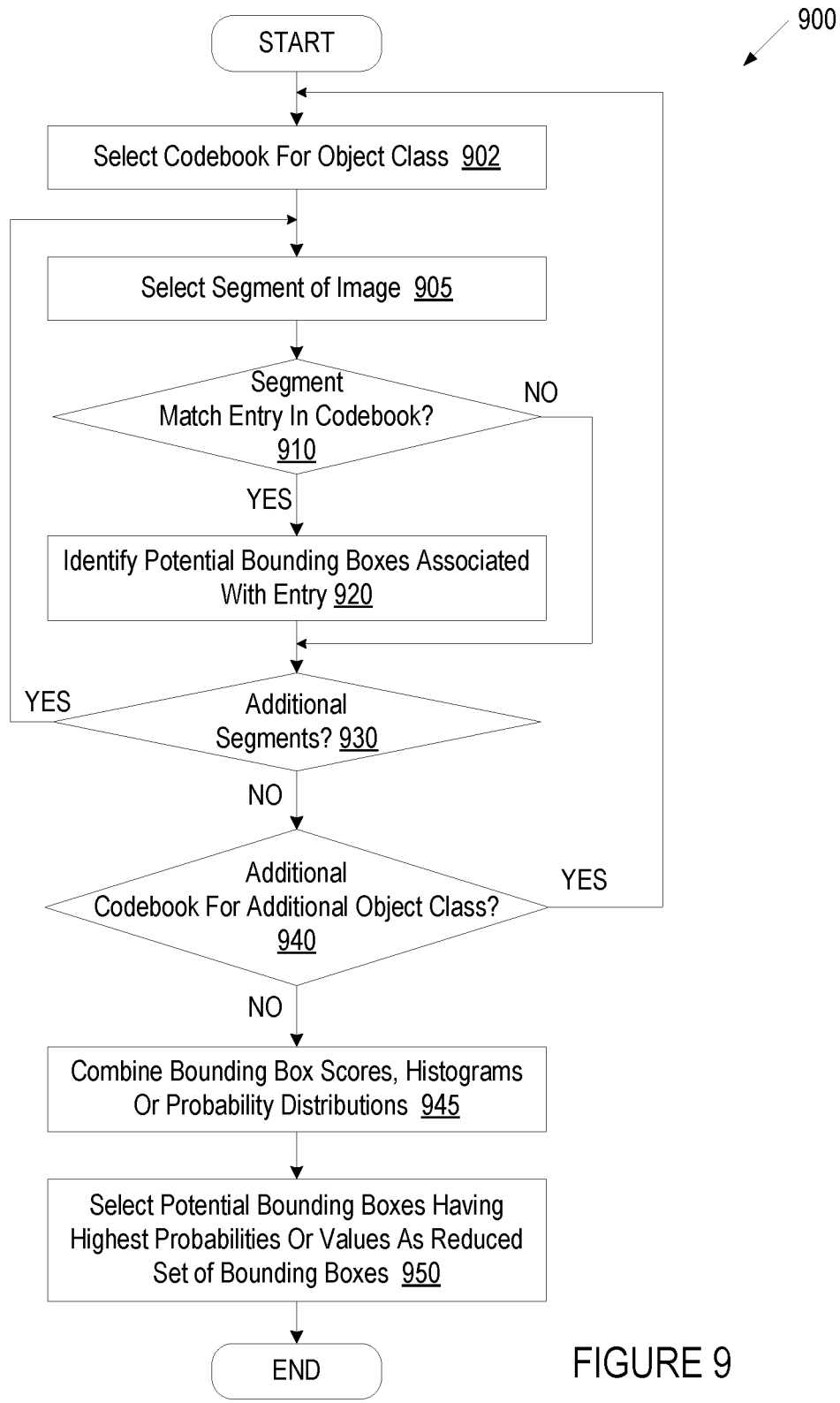
FIG. 9 is a flow diagram illustrating yet another embodiment for a method of performing object recognition based on segment localization.

FIG. 9 is a flow diagram illustrating yet another embodiment for a method 900 of performing object recognition based on segment localization. In one embodiment, method 900 is performed at blocks 710 and/or 715 of method 700. At block 902 of method 900, processing logic selects a codebook for a particular object class. At block 905, processing logic selects a segment of an image. At block 910, processing logic determines whether the segment matches an entry in the codebook. If the segment matches an entry in the codebook, the method continues to block 920. Otherwise, the method proceeds to block 930.

At block 920, processing logic identifies potential bounding boxes associated with the entry. The potential bounding boxes may be defined by discrete bounding boxes having bounding box scores, by a histogram of potential bounding boxes or by a probability distribution over bounding boxes.

At block 930, processing logic determines if there are any additional segments of the image that have not been compared to the codebook. If so, the method returns to block 905 and a new segment of the image is selected. Otherwise, the method continues to block 940.

At block 940, processing logic determines whether there are any additional codebooks that segments of the image have not yet been compared to. Each codebook may be associated with a particular object class, and may be used to detect and recognize objects of that object class. If there is a codebook that segments of the image have not yet been compared to, the method returns to block 902 and a new codebook is selected. Otherwise, the method continues to block 945.

At block 945, processing logic combines the potential bounding boxes (e.g., combines potential bounding box scores, histograms or probability distributions) identified by the multiple segments. At block 950, processing logic selects one or more potential bounding boxes having highest probabilities or values as a reduced set of bounding boxes. The method then ends.

Figure 10:
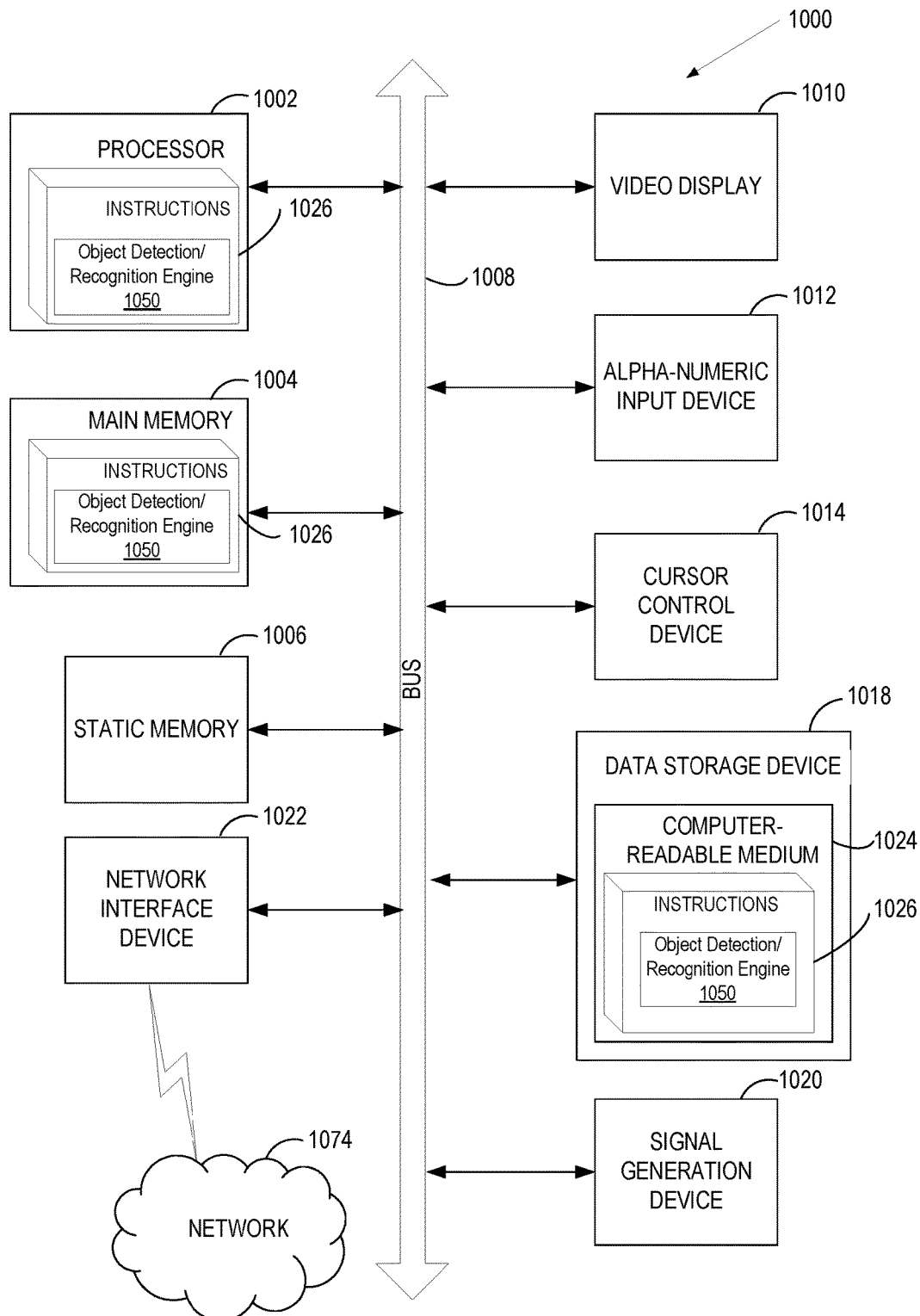
FIG. 10 is a block diagram of an exemplary computer system that may perform one or more of the operations described herein.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1018 may include a computer-readable storage medium 1024 on which is stored one or more sets of instructions 1026 (e.g., software) embodying any one or more of the methodologies or functions described herein. The instructions 1026 may also reside, completely or at least partially, within the main memory 1004 and/or within the processor 1002 during execution thereof by the computer system 1000, the main memory 1004 and the processor 1002 also constituting computer-readable storage media. The instructions 1026 may further be transmitted or received over a network 1074 via the network interface device 1022.

In one embodiment, the instructions 1026 include instructions for an object detection/recognition engine 1050, which may correspond to object detection/recognition engine 305 of FIG. 3, and/or a software library containing methods that call an object detection/recognition engine. Alternatively, or in addition, instructions 1026 may include instructions for an object model creator (not shown) such as object model creator 205 of FIG. 2, and/or a software library containing methods that call an object model creator. While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
identifying a training set of images, wherein each image in the training set has an identified bounding box that comprises an object class and an object location for an object in the image;
segmenting each image of the training set, wherein segments comprise sets of pixels that share visual characteristics, and wherein each segment is associated with an object class;
clustering the segments based on object classes; and
generating, by a processing device, a data structure associated with the training set of images based on the clustering, wherein each of a plurality of entries in the data structure comprises a set of visual characteristics for a prototypical segment from the training set of images and further comprises an associated set of potential bounding boxes, the prototypical segment representing a combination of similar segments with objects of a same object class across different images from the training set of images, wherein the data structure is usable to predict bounding boxes of additional images that each include an object having an object class.

2. The method of claim 1, wherein the clustering is performed using a support vector machine.

3. The method of claim 1, wherein the data structure is a codebook, wherein each entry in the data structure is a code word, and wherein each code word comprises a probability distribution over potential bounding boxes.

4. The method of claim 3, wherein each entry in the data structure comprises a discrete histogram of bounding boxes associated with a prototypical segment from the training data set.

5. The method of claim 1, further comprising:
determining a weighting value for each entry in the data structure based on a frequency that the segment occurred in the object, wherein each weighting value indicates how strongly the bounding boxes in the entry affect a bounding box prediction.

6. The method of claim 1, further comprising:
generating data structures for a plurality of different object classes.

7. The method of claim 1, further comprising:
segmenting a current image into a plurality of segments, wherein each segment of the plurality of segments of the current image has a segment location and a set of pixels that share visual characteristics;
for each segment of the current image, finding in the data structure an entry identifying a set of visual characteristics of a respective prototypical segment that are most similar to visual characteristics of the segment of the current image to determine a set of potential bounding boxes associated with the entry;
determining an initial set of bounding boxes for the current image based on sets of potential bounding boxes for the plurality of segments of the current image; and
determining a reduced set of bounding boxes based on combining bounding boxes of the initial set of bounding boxes, the reduced set of bounding boxes corresponding to one or more objects in the current image, each of the one or more objects having an object class and an object location.

8. A non-transitory computer readable storage medium having instructions that, when executed by a processing device, cause the processing device to perform a method comprising:
identifying a training set of images, wherein each image in the training set has an identified bounding box that comprises an object class and an object location for an object in the image;
segmenting each image of the training set, wherein segments comprise sets of pixels that share visual characteristics, and wherein each segment is associated with an object class;
clustering the segments based on object classes; and
generating a data structure associated with the training set of images based on the clustering, wherein each of a plurality of entries in the data structure comprises a set of visual characteristics for a prototypical segment from the training set of images and further comprises an associated set of potential bounding boxes, the prototypical segment representing a combination of similar segments with objects of a same object class across different images from the training set of images, wherein the data structure is usable to predict bounding boxes of additional images that each include an object having an object class.

9. The computer readable storage medium of claim 8, wherein the data structure is a codebook, wherein each entry in the data structure is a code word, and wherein each code word comprises a probability distribution over potential bounding boxes.

10. The computer readable storage medium of claim 8, wherein each entry in the data structure comprises a discrete histogram of bounding boxes associated with a prototypical segment from the training data set.

11. The computer readable storage medium of claim 8, the method further comprising:
determining a weighting value for each entry in the data structure based on a frequency that the segment occurred in the object, wherein each weighting value indicates how strongly the bounding boxes in the entry affect a bounding box prediction.

12. The computer readable storage medium of claim 8, wherein the clustering is performed using a support vector machine.

13. The computer readable storage medium of claim 8, wherein the method further comprises:
generating data structures for a plurality of different object classes.

14. The computer readable storage medium of claim 8, wherein the method further comprises:
segmenting a current image into a plurality of segments, wherein each segment of the plurality of segments of the current image has a segment location and a set of pixels that share visual characteristics;

for each segment of the current image, finding in the data structure an entry identifying a set of visual characteristics of a respective prototypical segment that are most similar to visual characteristics of the segment of the current image to determine a set of potential bounding boxes associated with the entry;

determining an initial set of bounding boxes for the current image based on sets of potential bounding boxes for the plurality of segments of the current image; and determining a reduced set of bounding boxes based on combining bounding boxes of the initial set of bounding boxes, the reduced set of bounding boxes corresponding to one or more objects in the current image, each of the one or more objects having an object class and an object location.

15. A computing device comprising:

a memory; and a processor, coupled to the memory, to:

identify a training set of images, wherein each image in the training set has an identified bounding box that comprises an object class and an object location for an object in the image;

segment each image of the training set, wherein segments comprise sets of pixels that share visual characteristics, and wherein each segment is associated with an object class;

cluster the segments based on object classes; and generate a data structure associated with the training set of images based on the clustering, wherein each of a plurality of entries in the data structure comprises a set of visual characteristics for a prototypical segment from the training set of images and further comprises an associated set of potential bounding boxes, the prototypical segment representing a combination of similar segments with objects of a same object class across different images from the training set of images, wherein the data structure is usable to predict bounding boxes of additional images that each include an object having an object class.

16. The system of claim 15, wherein the processor is to use a support vector machine to cluster the segments.

17. The system of claim 15, wherein the data structure is a codebook, wherein each entry in the data structure is a code word, and wherein each code word comprises a probability distribution over potential bounding boxes.

18. The system of claim 17, wherein each entry in the data structure comprises a discrete histogram of bounding boxes associated with a prototypical segment from the training data set.

19. The system of claim 15, wherein the processor is further to:

determine a weighting value for each entry in the data structure based on a frequency that the segment occurred in the object, wherein each weighting value indicates how strongly the bounding boxes in the entry affect a bounding box prediction.

20. The system of claim 15, wherein the processor is further to:

generate data structures for a plurality of different object classes.

* * * * *